United States Patent [19]

Akama

[11] Patent Number: 5,042,643
[45] Date of Patent: Aug. 27, 1991

[54] ELLIPTIC VIBRATORY PART-FEEDING DEVICE

[75] Inventor: Masaru Akama, Shizuoka, Japan
[73] Assignee: Shinko Electric Co., Ltd., Tokyo, Japan
[21] Appl. No.: 438,629
[22] Filed: Nov. 17, 1989

[30] Foreign Application Priority Data

Nov. 21, 1988 [JP] Japan ................. 63-294425

[51] Int. Cl.⁵ ............................................. B65G 27/32
[52] U.S. Cl. ................................. 198/753; 198/572; 198/757
[58] Field of Search .................. 198/464.4, 572, 577, 198/751, 752, 753, 757, 769

[56] References Cited

U.S. PATENT DOCUMENTS

| | | | |
|---|---|---|---|
| 2,662,193 | 12/1983 | Weyandt | 198/769 X |
| 3,162,874 | 12/1964 | Autio | 198/757 X |
| 3,500,993 | 3/1970 | Tarzian | 198/769 X |
| 3,587,833 | 6/1971 | Byrum et al. | 198/751 |
| 3,658,172 | 4/1972 | Hacker | 198/753 |
| 4,000,807 | 1/1977 | Molique | 198/757 X |
| 4,181,216 | 1/1980 | Cipu | 198/757 |
| 4,354,618 | 10/1982 | Weyandt | 198/753 X |
| 4,362,455 | 12/1982 | Hirose | 198/757 X |
| 4,678,073 | 7/1987 | Anderson et al. | 198/577 X |
| 4,679,708 | 7/1987 | Spence | 198/757 X |

FOREIGN PATENT DOCUMENTS

| | | | |
|---|---|---|---|
| 0027808 | 2/1982 | Japan | 198/751 |
| 0197507 | 10/1985 | Japan | 198/752 |
| 0111816 | 5/1987 | Japan | 198/757 |
| 0800047 | 1/1981 | U.S.S.R. | 198/751 |

*Primary Examiner*—Robert P. Olszewski
*Assistant Examiner*—James R. Bidwell
*Attorney, Agent, or Firm*—Jones, Day, Reavis & Pogue

[57] ABSTRACT

In an elliptic vibratory part-feeding device which includes a feeder bowl in which a spiral track is formed; a first spring for supporting the feeder bowl so as to be vibratile in a horizontal direction; a first electro-magnet for exciting the feeder bowl in the horizontal direction; a second spring for supporting the feeder bowl so as to be vibratile in a vertical direction; a second electro-magnet for exciting the feeder bowl in the vertical direction; an alternating electric power source; a phase-difference forming circuit through which voltages different from each other in phase are supplied to the first and second electro-magnet from the alternating electric power source; and a part-jamming detector when part-jamming is detected in the feeder bowl by the part-jamming detector, the feeding direction of the parts on the spiral track is reversed by the change-over or adjustment of the phase-difference forming circuit.

10 Claims, 8 Drawing Sheets

FIG. 9
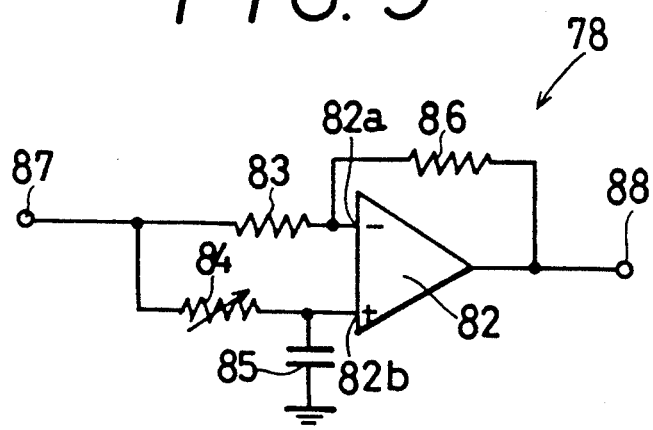
FIG. 10
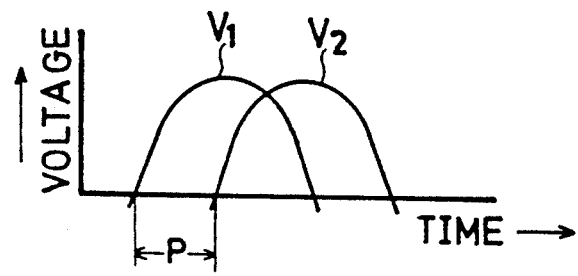
FIG. 11A
FIG. 11B
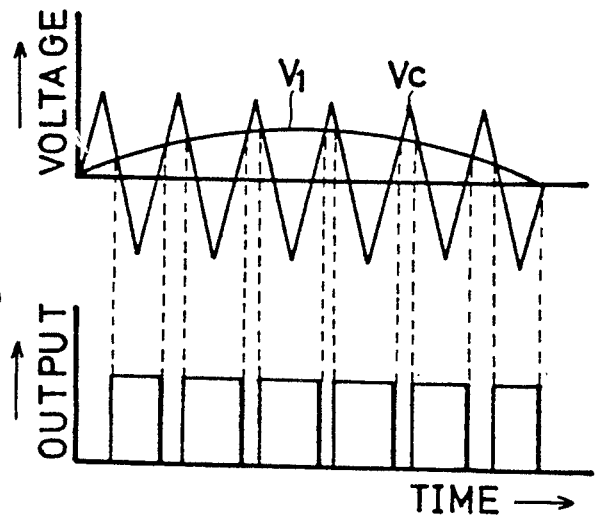

5,042,643

ELLIPTIC VIBRATORY PART-FEEDING DEVICE

BACKGROUND OF THE INVENTION

1. Field of the Invention

This invention relates to an elliptic vibratory part-feeding device.

2. Description of the Prior Art

A vibratory part-feeding device in which parts or workpieces are transported on a spiral track formed in a feeder bowl by torsional vibration, is widely known. Generally, it is provided with any posture-regulating means for putting the feeding part into a predetermined posture. The parts are supplied one by one under the predetermined posture to the next process from the vibratory part-feeding device. However, some kinds of parts or parts of some shapes are apt to jam at the posture-regulating means. When the parts are jammed, they cannot be fed to the downstream side. The part-jamming is detected by any detecting means. A jam-releasing means such as air-jetting means is actuated with the detecting output of the detecting means. The jammed parts are forcibly ejected to the inside of the feeder bowl.

For example, the manufacture for attaching the air-jetting means to the feeder bowl is required for the feeder bowl. Further in some cases, a through hole for passing the jetted air should made in the side wall of the feeder bowl. A manufacturing operation for making the through hole is very troublesome. The part-jamming cannot be released in some manufacturing errors of the through hole which direction, for example, is somewhat deviated from the predetermined direction.

Recently, an elliptic vibratory part-feeding device was developed, in which the feeder bowl is vibrated in an elliptical manner. A locus of the point on the wall surface of the feeder bowl is elliptic in the elliptic vibratory part-feeding device. Generally, a feeding speed of an elliptic vibratory part-feeding device is higher than that of a usual vibratory part-feeding device in which a locus of the point on the wall surface of the feeder bowl is linear along the curved surface of the wall of the feeder bowl. The part-jamming is more apt to occur in the elliptic vibratory part-feeding device than in the usual vibratory part-feeding device.

SUMMARY OF THE INVENTION

Accordingly, it is an object of this invention to provide an elliptic vibratory part-feeding device in which the part-jamming, if occurs, can be securely released without special manufacture and at lower cost.

In accordance with an aspect of this invention, an elliptic vibratory part-feeding device comprises: (A) a feeder bowl in which a spiral track is formed; (B) a first spring means for supporting said feeder bowl so as to be vibratile in a horizontal direction; (C) a first electro-magnet means for exciting said feeder bowl in the horizontal direction; (D) a second spring means for supporting said feeder bowl so as to be vibratile in a vertical direction; (E) a second electro-magnet means for exciting said feeder bowl in the vertical direction; (F) an alternating electric power source; (G) a phase-difference forming means through which voltages different from each other in phase are supplied to said first and second electro-magnet means from said alternating electric power source; and (H) a part-jamming detecting means in which, when part-jamming is detected in said feeder bowl by said part-jamming detecting means, the feeding direction of the parts on said spiral track is reversed by the change-over or adjustment of said phase-difference forming means.

The foregoing and other objects, features, and advantages of the present invention will be more readily understood upon consideration of the following detailed description of the preferred embodiments of the invention, taken in conjunction with the accompanying drawings.

BRIEF DESCRIPTION OF THE DRAWINGS

FIG. 9 is a circuit diagram showing the detail of a phase shifter in FIG. 7;

FIG. 10 is graph for explaining operation of the phase shifter of FIG. 9;

FIGS. 11A and 11B are graphs for explaining operation of the inverting control part in the drive circuit of FIG. 7;

DESCRIPTION OF THE PREFERRED EMBODIMENTS

Figure 1:
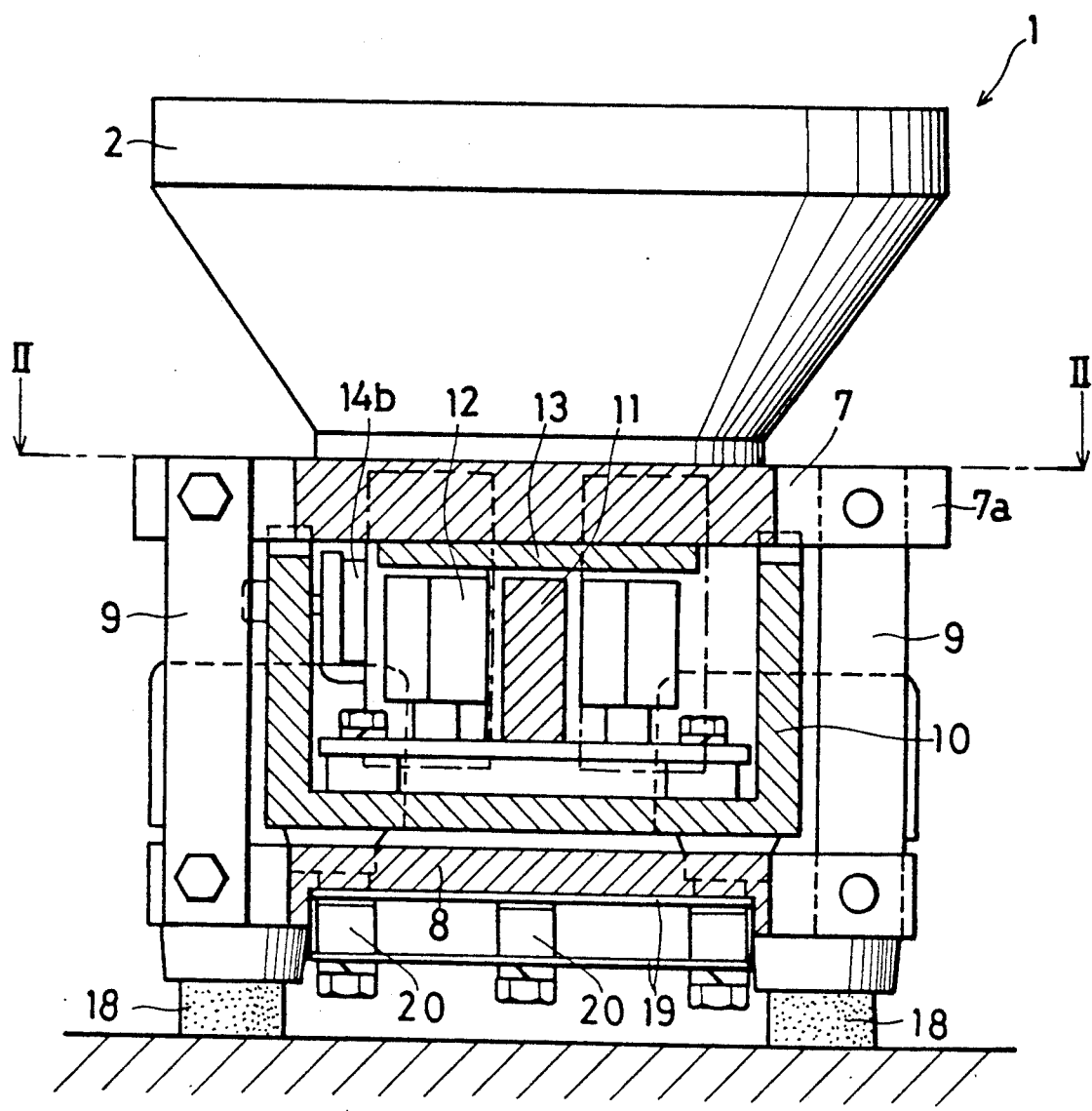
FIG. 1 is a partially cross-sectional front view of an elliptic vibratory part-feeding device according to one embodiment of this invention.

First, an elliptic vibratory part-feeding device according to one embodiment of this invention will be described with reference to FIG. 1 to FIG. 5.

An elliptic vibratory part-feeding device 1 has a feeder bowl 2. A spiral track 3 is formed on the inner wall of the feeder bowl 2 as shown in FIG. 5A. A wiping plate 4 is bended and fixed to the periheral wall of the feeder bowl 2 at the downstream side of the spiral track 3. The distance between the lower end of the wiping plate 4 and the surface of the track 3 is larger than the thickness of, for example, a plate-like part m to be fed, but smaller than the double thickness of the plate-like part m as shown in FIG. 5B. A straight guide track 5 is fixed to the discharge end of the spiral track 3. A restricted straight groove is formed in the guide track 5, and it is covered by a plate. The width of the groove is slightly larger than that of the part m. The depth of the groove is slightly larger than the thickness of the part m. Accordingly, the rectangular part m is transported along its longer side in the restricted groove in single layer and row, and it is supplied to a linear vibratory feeder 6. A slight gap is made between the guide track 5 and the linear vibratory feeder 6 so as not to interact with each other.

Figure 2:
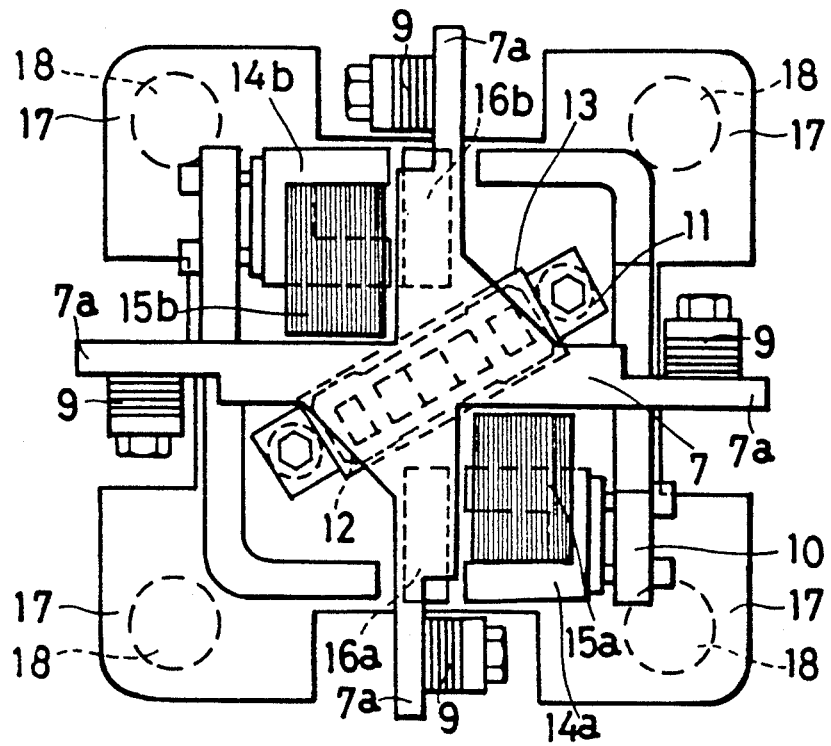
FIG. 2 is a plan view taken along the line II—II in FIG. 1.
Figure 3:
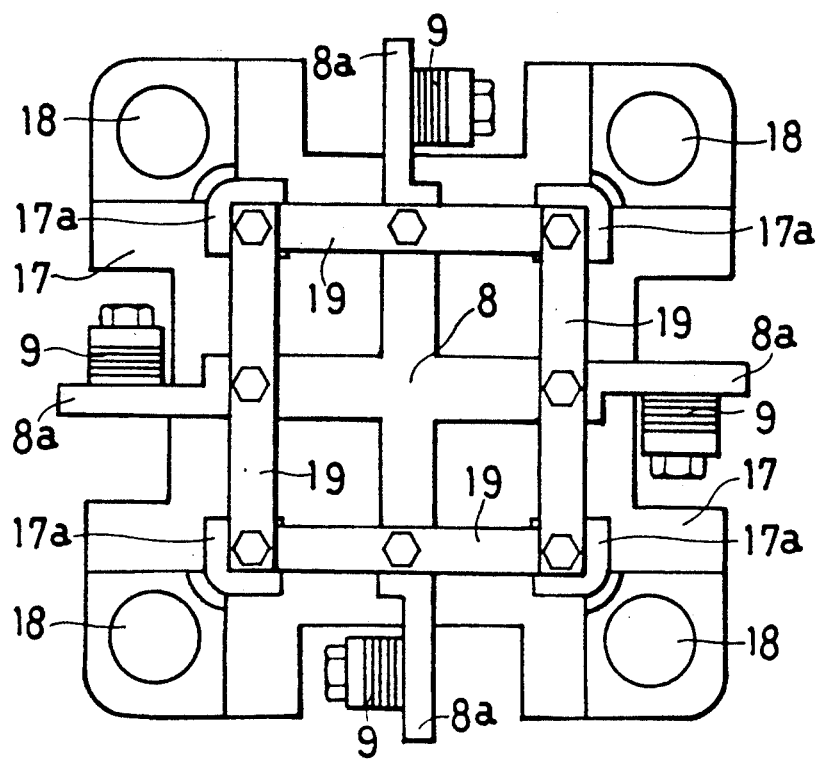
FIG. 3 is a bottom view of the elliptic vibratory part-feeding device of FIG. 1.

The feeder bowl 2 is fixed at a cross-shaped upper frame 7, as shown in FIG. 2, which is combined with a cross-shaped lower frame 8, as shown in FIG. 3, by four sets of upright stacked leaf springs 9. Upper end portions of the stacked leaf springs 9 are fixed to four end portions 7a of the upper frame 7 by bolts. Lower end portions of the stacked springs 9 are fixed to four end portions 8a of the lower frame 3 by bolts. The end portions 7a and 8a of the upper and lower frames 7 and 8 are vertically aligned with each other.

A vertical drive electromagnet 11 is fixed to a central portion of a base frame 10, facing to a central portion of the upper frame 7. An armature 13 for vertical drive is fixed to the lower surface of the central portion of the upper frame 7. An air gap is made between the vertical drive electromagnet 11 and the armature 13. A coil 12 is wound on the vetical drive electromagnet 11. A pair of horizontal drive electromagnets 14a and 14b are fixed to opposite side walls of the base frame 10 at both sides of the vertical drive electromagnet 11, as clearly shown in FIG. 2. Coils 15a and 15b are wound on the horizontal drive electromagnets 14a and 14 b respectively. Armatures 16a and 16b for horizontal drive are fixed to the lower surfaces of the arm portions of the upper frame 7, facing to the electromagnets 14a and 14b. Air gaps are made between the armatures 16a and 16b and the electromagnets 14a and 14b, respectively.

Four leg portions 17 are formed integrally with the frame 10, and they are supported through rubber isolators 18 onto the ground. Spring receiving portions 17a are formed integrally with the corners of the leg portions 17, as clearly shown in FIG. 3. Four sets of horizontal stacked leaf springs 19 are fixed to the spring receiving portions 17a at the ends by bolts. As shown in FIG. 1, spacers 20 are arranged between the leaf springs 19. The central portions of the leaf springs 19 are fixed to the arm portions of the lower frame 8 by bolts.

In the linear vibratory feeder 6, a base block 21 is combined with a movable block 50 by a pair of leaf springs 24, and it is supported through a base 22 and rubber isolators 23 onto the ground. An electromagnet 53 with a coil 52 is fixed on the base block 21. An armature 54 is fixed to the movable block 50 A slender trough 51 is fixed on the movable block 51. As shown in FIG. 5A, a straight groove 26 is formed between side wall portions 25a and 25b, in the trough 51. A part-overflow detecting part-jamming detecting apparatus Q which includes a light-emitting element 27 and a light-detecting element 28, is arranged adjacent to the upper-stream side of the trough 51. Although not shown, a small through hole is made facing to the light-emitting element 27, in the bottom of the groove 26. When the small through hole is not covered with a part m, the light-detecting element 28 can receive the light emitted from the light-emitting element 27. An output terminal of the light-emitting element 27 is connected to a control circuit 29. Four output terminals 30, 31 60 and 61 are connected to input terminals 30', 31' 60' and 61' of a drive circuit for the vibratory part-feeding device 1 shown in FIG. 6.

Next, the detail of the drive circuit for the vibratory part-feeding device will described with reference to FIG. 6.

This drive circuit consists mainly of a horizontal drive part 32A, a vertical drive part 32B, a first relay 33 for slow feed, a second relay 34 for over-flow release, and change-over switches $SW_2$ and $SW_3$. A three-phase alternating power (AC) source which generates three sinusoidal voltages different by 120° in phase from each other, as well known, is connected to this drive circuit. The three phases are denominated as R, S and T in the order of the phase. A R-input terminal is connected through a ganged power switch $SW_1$ and a fuse 38 to the horizontal drive part 32A and through the change-over switches $SW_2$, $SW_3$ to the vertical drive part 32B. A S-input terminal is connected through the ganged power switch $SW_1$ and fuse 38 to another input terminal of the horizontal drive part 32A and through the change-over switches $SW_2$, $SW_3$ to the vertical drive part 32B. And a T-input terminal is connected through the ganged power switch $SW_1$, fuse 38 and the change-over switch $SW_2$ to the vertical drive part 32B. The two of the input terminals R, S and T are selected by the change-over switches $SW_2$, $SW_3$ and are connected to the vertical drive part 32B.

Generally, a spiral track is formed clockwise or counterclockwise in a feeder bowl of a vibratory part-feeding device. The change-over switch $SW_2$ is changed over in accordance with the winding direction of the spiral track. The change-over operation is manually effected on the start of the drive. For example, although not shown, a feeding-direction change-over switch for counterclockwise direction and clockwise direction is arranged in the control circuit 29. According to this embodiment, the spiral track 3 is formed in the counterclockwise direction as shown in FIG. 5A. Accordingly, the feeding-direction change-over switch is changed over to the position for the counterclockwise direction in the control circuit 29. Thus, the movable contacts 39 to 42 are changed over to the shown position as shown in FIG. 6.

Figure 6:
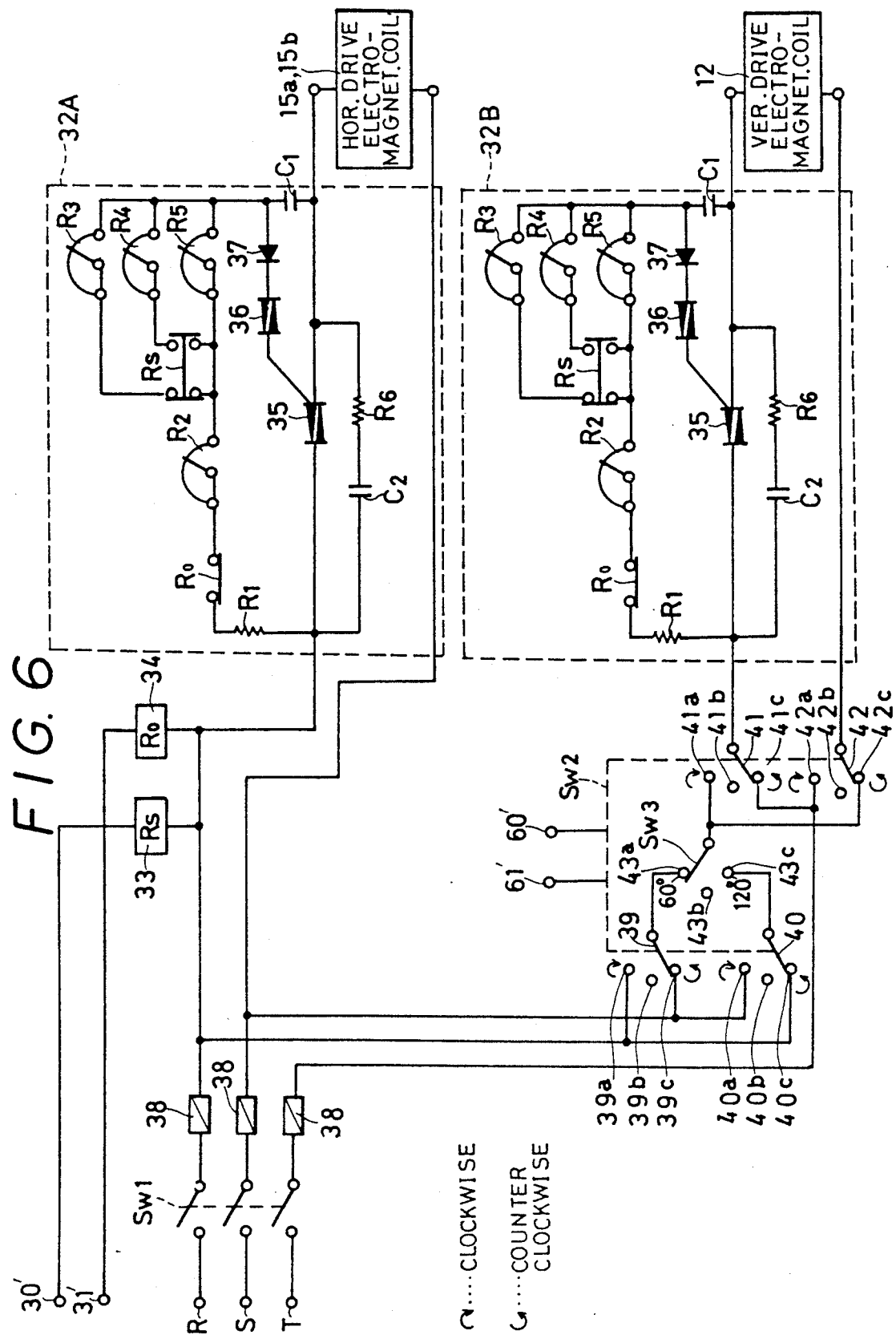
FIG. 6 is a block diagram of a drive circuit for the elliptic vibratory part-feeding device of FIG. 4.

Detecting output P is obtained from the output terminal 60 of the control circuit 29 in accordance with the change-over direction of the feeding-direction change-over switch and it is supplied to an input terminal 60' of the drive circuit of FIG. 6. Accordingly, the movable contacts 39 to 42 are changed over to stationary contacts 39c to 42c as shown in FIG. 6. Further according to this embodiment, the control circuit 29 receives an output G from a part-overflow detecting/part-jamming detecting apparatus Q. When the light detecting element 28 receives continuously the light from the light emitting element 27 for a longer time than the predetermined time, the control circuit 29 generates a jam-detecting output S at its output terminal 61. It is supplied to the input terminal 61' of the drive circuit in FIG. 6. Thus, the previously set position of the change-over switch $SW_2$ is changed over to other stationary contacts. Thus, according to this embodiment, the movable contacts 39 to 42 are automatically changed over to the stationary contacts 39a to 42a for the clockwise direction when the part-jamming is detected. The change-over is continued for a predetermined time and then the change-over switch $SW_2$ is again changed over to the initial position. For that purpose, the control circuit 29 includes a timer means.

The change-over switch $SW_3$ functions to change-over the phase difference between the voltage supplied to the horizontal drive part 32A and the voltage supplied to the vertical drive part 32B into 60° or 120°. In the change-over switch $SW_2$, movable contacts 39, 40, 41, 42 are ganged with each other. As shown, the movable contacts 39 to 42 are connected to the stationary contacts 39c, 40c, 41c and 42c for the counterclockwise direction, respectively. When the change-over switch SW$_3$ is connected to a stationary contact 43a for 60° the T input is supplied to one input terminal of the vertical drive part 32B and the S input is supplied to another input terminal of the vertical drive part 32B. When the change-over switch SW$_2$ is changed over into the stationary contacts 39a, 40a, 41a and 42a from the shown position, the R input is supplied to the one input terminal of the vertical drive part 32B and the T input is supplied to the other input terminal of the vertical drive part 32B. Thus, a voltage advancing or retarding in a phase of 60° to the voltage applied to the horizontal drive part 32A is supplied to the vertical drive part 32B. When the change-over switch SW$_3$ is changed over to the stationary contact 43c for 120° a voltage advancing or retarding in phase of 120° to the voltage applied to the horizontal drive part 32A is supplied to the vertical drive part 32B in accordance with the change over position of the change-over switch SW$_2$. When the change-over swithes SW$_2$ and SW$_3$ are connected to neutral stationary contacts 39b, 40b 41b, 42b and 43b respectively, no voltage is supplied to the vertical drive part 32B. The first relay 33 for slow feed and the second relay 43 for overflow release are connected between input terminals 30', 31' and the R input line.

The movable contacts Rs and Ro of the relays 33 and 34 are arranged in the horizontal drive part 32A and the vertical drive part 32B. The circuit constructions of the drive parts 32A and 32B are equal to each other. Accordingly, next only the detail of the horizontal drive part 32A will b described.

The one input terminal of the horizontal drive part 32A is connected through a triac 35 to one end of the horizontal drive coils 15a and 15b and the other input terminal thereof is directly connected to the other terminals of the horizontal drive coils 15a, 15b. A series circuit of a diac 36 and a diode 37 is connected to a control gate of the triac 35. A capacitor C$_1$ is connected between an anode of the diode 37 and the output electrode of the triac 35. A resistor circuit for controlling the fire angle of the triac 35 is connected between the input electrode of the triac 35 and the connecting point between the diode 37 and the capacitor C$_1$. The resistor circuit consists of a fixed resister R$_1$, variable resistors R$_2$, R$_3$, R$_4$ and R$_5$ and the movable contacts R$_o$ and R$_s$ of the relays 33 and 34. The fixed resistor R$_1$, the movable contact R$_o$ and the variable resistors R$_2$ and R$_5$ are connected in series with each other. The variable resistors R$_3$ and R$_4$ are connected in parallel with the variable resistor R$_5$. Anyone of the variable resistors R$_3$ and R$_4$ is selected by the change over of the movable contact R$_3$ of the relay 33. The variable resistor R$_2$ is used for determining the maximum of the fire angle of the triac 35, therefore the maximum of the horizontal drive force. The variable resistor R$_5$ is used for determining the minimum of the fire angle of the triac 35, therefore the minimum of the horizontal drive force. The variable resistors R$_3$ and R$_4$ are used for adjusting the horizontal drive force within the range of the above maximum and minimum values. The one variable resistor R$_3$ is used for high speed feeding while the other variable resistor R$_4$ is used for low speed feeding.

The series circuit of a capacitor C$_2$ and the resistor R$_6$ is further connected in parallel with the triac 35 and functions as a surge-killer. The variable resistors R$_3$ and R$_4$ of the horizontal drive part 32A and the vertical drive part 32B are so designed as to be ganged with each other, although not shown.

Next, operation of the above described elliptic vibratory part-feeding device 1 will be described.

Figure 5:
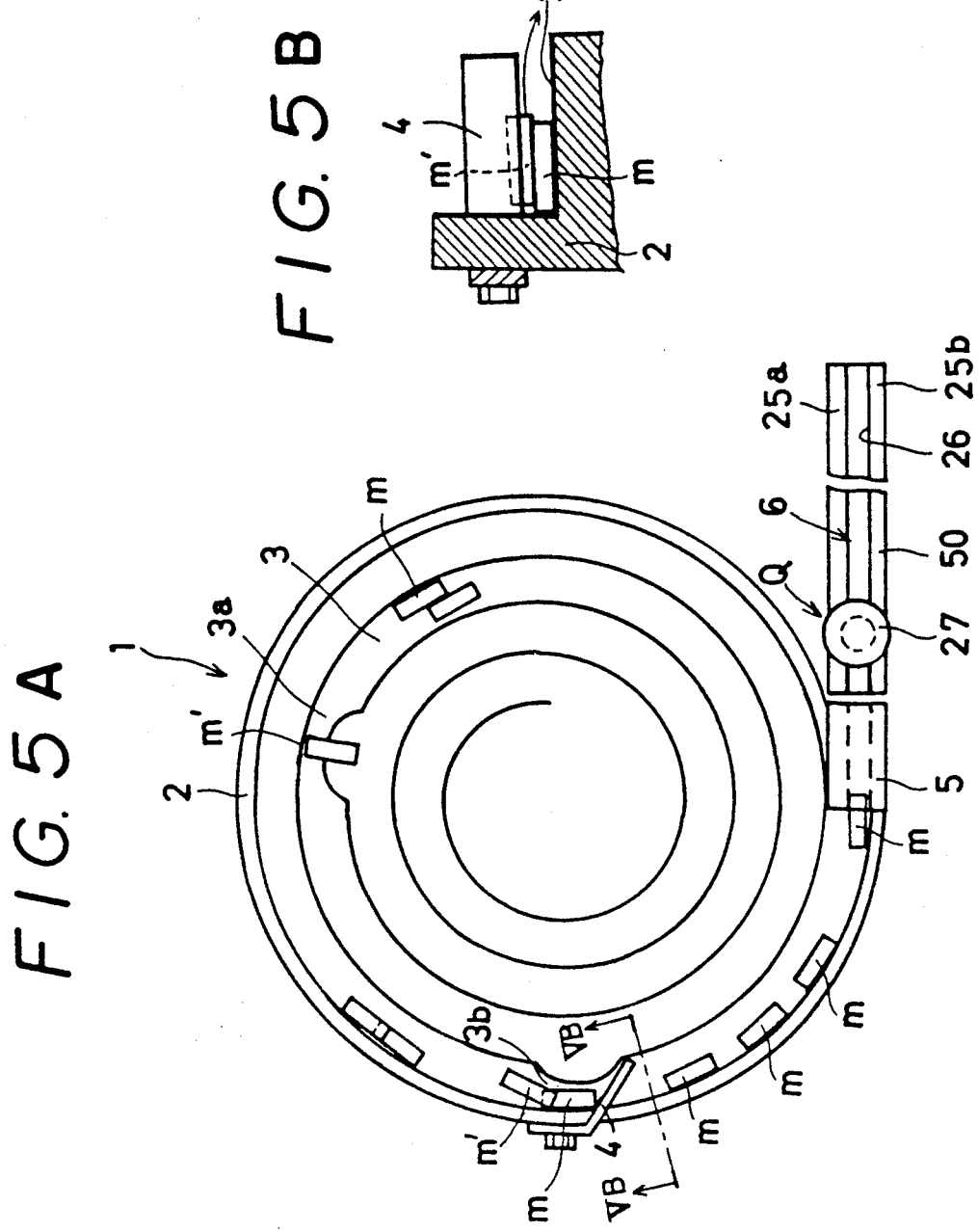
FIG. 5A is a plan view of the whole shown in FIG. 4.
FIG. 5B is an enlarged cross sectional view taken along the line VB—VB in FIG. 5A.

Before the elliptic vibratory part-feeding device 1 is driven, the change-over switch SW$_2$ is changed over to the stationary contact for the counterclockwise direction in the drive circuit of FIG. 6, since the spiral track 3 is formed in the counterclockwise direction as shown in FIG. 5. Next, the power switch SW$_1$ is closed. The voltage between the R-S phases is supplied to the horizontal drive part 32A, while the voltage between the T-S phases is supplied to the vertical drive par 32B. The change-over switch SW$_3$ remains changed over for the stationary contact 42a for 60°. The triac 35 becomes conductive in accordance with the fire angle which is determined by the resistance value of the resistor circuit constituted by the resistors R$_1$, R$_2$, R$_3$ and R$_5$. Thus, a current of intensity corresponding to the fire angle flows through the horizontal drive coils 15a, 15b and the vertical drive coil 12. Since the relay 33 is not energized, the movable contact R$_3$ thereof is connected to the left-side stationary contact as shown in FIG. 6. Accordingly, the variable resistor R$_3$ for high speed feeding is connected in parallel with the variable resistor R$_5$.

Current controlled in phase angle flows through the horizontal drive coils 15a, 15b and the vertical drive coil 12. Thus, a vertical vibrating force and a horizontal vibrating force different by 60° in phase from each other are supplied to the feeder bowl 2. Thus, the feeder bowl 2 vibrates elliptically in the frequency of the alternating power source as shown by the arrow mark B in FIG. 4. The frequency of the commercial supply as the alternating power source is 50 H$_z$ or 60 H$_z$. The mark B is exaggeratedly indicated as a focus of one point on the wall of the bowl 2.

The length of the long axis of the elliptic vibration is adjusted with the variable resistor R$_3$ in the high speed feeding operation. It is adjusted with the variable resistor R$_4$ in the low speed feeding operation. It is equal to about 0 to 3 mm.

One vibrating force in the vertical direction is applied to the feeder bowl 2 of the elliptic vibratory part-feeding device 1 by the vertical drive electro-magnet 11. Another vibrating force in the horizontal direction is applied to it by the pair of the horizontal drive electro-magnets 14a and 14b. Elliptic vibrating force is obtained by composition of the horizontal and vertical vibrating forces. It is experimentally proved that the maximum feeding speed can be obtained in the phase difference of about 60° between the vertical driving force and the horizontal driving force.

Natural or resonant frequency of the elliptic vibratory part-feeding device 1 in the vertical direction is determined by the weight of the feeder bowl 2 and the spring constant of the leaf springs 19. On the other hand, the natural frequency of the elliptic vibratory part-feeding device 1 in the horizontal direction is determined by the weight of the feeder bowl 2 and the spring constant of the leaf springs 9. It is difficult to make the natural frequencies in the vertical and horizontal directions equal to each other from the ground of the constructive design. It is preferable that the natural frequency is made nearly equal to the driving frequency in a vibratory machine of such a kind. However, that is troublesome.

However, according to this embodiment, even when the natural frequencies of the elliptic vibratory part-feeding device 1 in the vertical and horizontal directions are not strictly equal to the driving frequency, almost the optimum vibratory or displacement of the bowl 2 condition can be obtained with the operation of the change-over switch $SW_3$. Generally, the phase difference between the force and the displacement is determined by the natural frequency of the system, ratio $\lambda$ of the natural frequency to the frequency of the vibrating force and a viscous coefficient of the spring. When the ratio $\lambda$ is equal to 1, namely when the natural frequency of the system is equal to the frequency of the vibrating force, the phase difference is equal to 90°. When the ratio $\lambda$ is considerably smaller than 1, the phase difference between the force and the displacement is equal to 0°. When the ratio $\lambda$ is considerably larger than 1, it is equal to 180°. It changes depending on the viscous coefficient of the spring. For example, when the springs 9, 19 are made of steel, the viscous coefficient is small. Accordingly, the phase difference between the vibrating force and the displacement is nearly equal to 0° at $\lambda < 1$ and it is nearly equal to 180° at $\lambda > 1$, even when $\lambda$ is nearly equal to 1.

Accordingly, when the natural frequencies of the vibratory part-feeding device 1 in the vertical and horizontal directions are near the drive frequency and larger than the latter, the phase differences between the force and the displacement in the respective directions are nearly equal to 0°. Accordingly, when the change-over switch $SW_3$ is changed over to the stationary contact 43a for 60°, the phase difference between the vibrations in the vertical and horizontal directions is equal to about 60°. Thus, in that case, the optimum condition which has been confirmed by the experiment can be obtained.

When the natural frequencies of the vibratory part-feeding device 1 in the vertical and horizontal directions are near the drive frequency and smaller than the latter, the phase difference between the force and displacement in the respective directions is equal to about 180°. Accordingly, when the change-over switch $SW_3$ is changed over to the position for 60°, the phase difference between the vibrations in the vertical and horizontal directions is equal to about 60°. Similarly the optimum condition which has been confirmed by the experiment, can be obtained.

Further, when the natural frequencies of the vibratory part-feeding device in the vertical and horizontal directions are both near the driving frequency, the natural frequency in one of the vertical and horizontal directions is larger than the driving frequency and natural frequency in the other thereof is smaller than the driving frequency, the phase difference between the force and the displacement in the one direction is about 180°, while the other of the vertical and horizontal directions is equal to about 0°. Accordingly, when the change-over switch $SW_3$ is changed over to the position for 60°, the phase difference between the displacement in the vertical and horizontal directions becomes $180° + 60° = 240°$ or $180° - 60° = 120°$ in dependence on the position of the change-over switch $SW_2$. In any case, the phase difference is greatly different from the optimum phase difference 60°.

However, according to this embodiment, when the change-over switch $SW_3$ is changed over to the stationary contact for 120°, a voltage advanced or retarded by 120° in phase from the voltage applied to the horizontal drive part 32A, is applied to the vertical drive part 32B in dependence on the contact position of the change over switch $SW_2$. Accordingly, the phase difference between the displacements in the vertical direction and horizontal direction, is equal to $(180° + 120° =) 300°$ or to $(180° - 120° =) 60°$. The feeder bowl 2 vibrates in sinusoidal manner, both in the vertical direction and in the horizontal direction.

At the phase difference of 300°, the vertical vibration or displacement is expressed as $b \sin (\omega t + 300°)$, if the horizontal vibration or displacement is expressed by a $\sin \omega t$. Since $b \sin (\omega t + 300°) = b \sin (360° + \omega t - 60°) = b \sin (\omega t - 60°)$, the phase difference between the vibrations in the vertical and horizontal directions is equal to 60° (lag).

Actually observing that the parts m are moving on the spiral track 3 in the driven feeder bowl 2, the change-over switch $SW_3$ is changed over to the stationary contacts for 60° and 120° phase differences, and one of the stationary contacts 43a and 43c is selected, at which the feeding speed of the parts m is higher than at the other stationary contact. As apparent from the naked eyes, the parts m jump irregularly at the one phase difference at which the feeding speed is lower, while the parts m smoothly flow or move at the other phase difference at which the feeding speed is higher.

The elliptic vibratory part-feeding device 1 is driven in the above described manner. The linear vibratory feeder 6 is driven at the same time. Although not shown, the bowl 2 contains numerous parts for example, electronic parts. The parts m are moved upwards along the spiral track 3 in the vibrating bowl 2. A stack of parts m is levelled by the wiping plate 4. A single layer of the parts m is led out from the wiping plate 4. The stacked parts m' are guided by the surface of the wiping plate 4 towards the center of the bowls 2 as shown in FIG. 5B. A procession of the parts m pass through the guide track 5, and are supplied into the straight groove 26 of the linear vibratory feeder 6. The parts m transported sideways fall down at narrow portions 3a and 3b in the spiral track 3.

Figure 4:
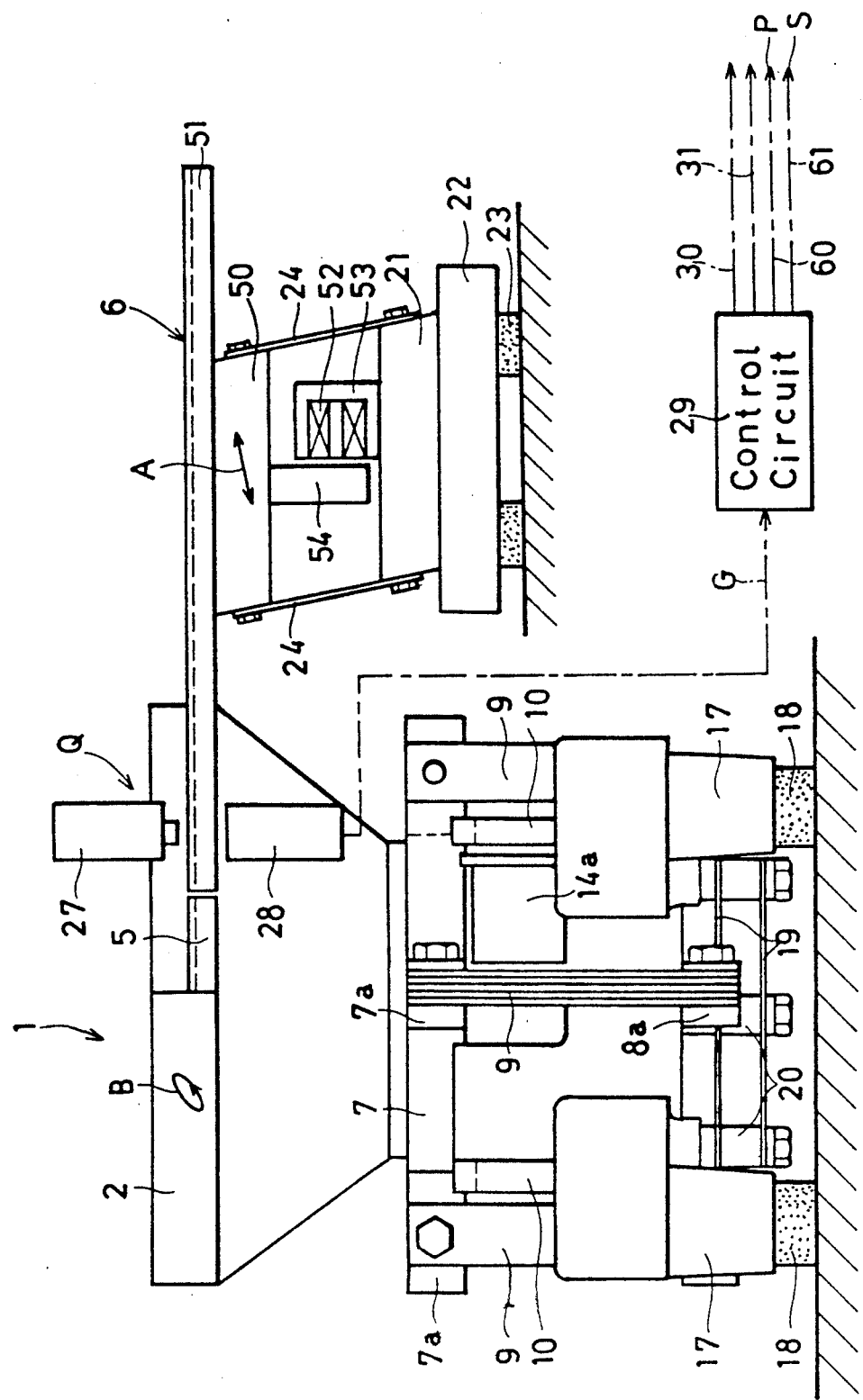
FIG. 4 is a side view of the whole of the elliptic vibratory part-feeding device of FIG. 1 and a linear vibratory feeder connected to the elliptic vibratory part-feeding device.

The trough of the linear vibratory feeder 6 is lenearly vibrated as shown by the arrow A in FIG. 4. The part m is transported rightwards in the groove 26 by vibration in FIG. 4. The parts m are continuously one by one supplied to the next process. Alternatively, the part m may be temporarily stopped by a stopper which is arranged adjacent to the discharge end of the groove 26, and it may be one by one picked up to be transported to the next stage by any vacuum attracting apparatus.

The parts m are continuously one by one supplied to the linear vibratory feeder 6 from the elliptic vibratory part-feeding device 1. When the groove 26 of the linear vibratory feeder 6 is so much oversupplied with the parts m that the parts m come to contact with each other or no spacing is made between the adjacent parts m, the light from the lightemitting element 27 is continuously intercepted from the light-detecting element 28. When the parts m flow with some spacing from each other, the intercepting time of the light is short, and again the light becomes incident on the liqhtdetecting element 28. The oversupply or overflow of the parts is judged by the fact that the lightdetecting element 28 does not receive the light from the light emitting element 27 continuously for a longer time than predetermined time. Thus, the control circuit 29 generates the overflow signal, and it is supplied through the output terminal 31 to the input terminal 31' of the drive circuit.

Accordingly, the relay 34 is energized to open the contacts $R_o$ (normally closed) in the horizontal and vertical dirve parts 32A and 32B.

Thus, the intensities of the currents flowing through the horizontal drive coils 15a and 15b, and the vertical drive coil 12, become zero. Accordingly, the elliptic vibratory part-feeding device 1 is stopped, and the supply of the parts m to the linear vibratory feeder 6 is stopped.

When the linear vibratory feeder 6 is released from the overflow condition, or when some spacing is made between the parts m, a overflow release signal is generated from the control circuit 29, and it is supplied through the output terminal 30 to the input terminal 30' of the drive circuit. Thus, the relay 33 is energized to move the contacts $R_s$ leftwards from the shown condition to the stationary contact for low speed feeding, in the horizontal and vertical drive parts 32A and 32B. Accordingly, the variable resistor R. for low speed feeding is connected in parallel with the resistor $R_5$. Currents of smaller intensities than in the case of the high speed feeding flow through the horizontal drive coils 15a and 15b, and the vertical drive coil 12. The resistance values of the variable resistors $R_3$ and $R_4$ are previously adjusted.

The feeder bowl 2 starts to vibrate in a small amplitude from the stop condition. The parts m start to move slowly on the spiral track 3. The postures or situations of the parts m are not greatly disturbed both in the upperstream of the wiping plate 4 as a part-regulating means and in the downstream thereof on the start of the feeder bowl 2. If the feeder bowl 2 starts to vibrate in a larger amplitude from the stop condition, a larger inertia is applied to the parts m, and so there is the fear that the postures and situations of the parts m are greatly disturbed. However, such a fear can be avoided according to this embodiment.

The overflow release signal continues for a predetermined time. The control circuit 29 includes timer means to set the predetermined time. With the dissipation of the overflow release signal, the contacts $R_s$ are moved right-wards again to the stationary contacts for high speed feeding in the horizontal and vertical drive parts 32A and 32B. Thus, the currents of larger intensities flow through the coils 15a, 15b and 12. Accordingly, the feeder bowl 2 comes to vibrate in larger amplitude, and so the parts m are transported again at the higer speed.

There has been described the case that the parts m can be smoothly transported on the spiral track 3 and be made the flow of the single layer by the wiping plate 4, to be supplied to the linear vibratory feeder 6. However, when the density of the parts m or the transporting speed of the parts m is relatively high, there is the fear that the parts m jam at the wiping plate 4 and they are not transported to the downstream of the wiping plate 4. In that case, the parts m are not supplied to the linear vibratory feeder 6.

Accordingly, i the part-overflow detecting-/part-jamming detecting apparatus Q, the light detecting element 28 receives the light from the light emitting element 27 continuously for a longer time than the predetermined time. The control circuit 29 judges thereby that the part-jamming has ocurred in the elliptic vibratory part-feeding device 1. Thus, it generates the feeding-direction inverting output S from the output terminal 61. The output S is supplied to the input terminal 61' in the drive circuit as shown in FIG. 6. Thus, the movable contacts 39 to 42 of the change-over switch $SW_2$ are automatically changed over to the stationary contacts 39a to 42a for the clockwise direction from the shown position. As clear from the above description, the parts m have been transported in the winding direction of the spiral track 3 as shown in FIG. 5A or in the counterclockwise direction. However, now the transporting direction is inverted to the clockwise direction. As above described, even when the natural frequencies in the vertical direction and the horizontal direction are not so designed to be equal to the driving frequency, the elliptic vibratory part-feeding device 1 vibrates almost in the optimum condition by the function of the change-over switch $SW_3$. However, since that condition is broken under the jamming situation, the parts m flow unsmoothly and jump somewhat irregularly. Such a motion acts to release the part jamming. The parts m jamming at the wiping plate 4 receive the force of the movement in the reverse direction. Accordingly, the jamming phenomenon can be immediately released. The feeding-direction inverting output S dissipates in a predetermined time after the jamming detecting output G dissipates.

Thus, in the drive circuit shown in FIG. 6, the movable contacts 39 to 42 of the change-over switch $SW_2$ are automatically changed over again to the stationary contacts 39c to 42c for the counterclockwise direction. Accordingly, the parts m are transported again along the winding direction of the spiral track 3 in the counterclockwise direction. The parts m are subjected to wiping function of the wiping plate 4 and are fed one by one to the linear vibratory feeder 6.

FIG. 7 to FIG. 11B show one modification of the drive circuit for the elliptic vibratory part-feeding device.

Figure 7:
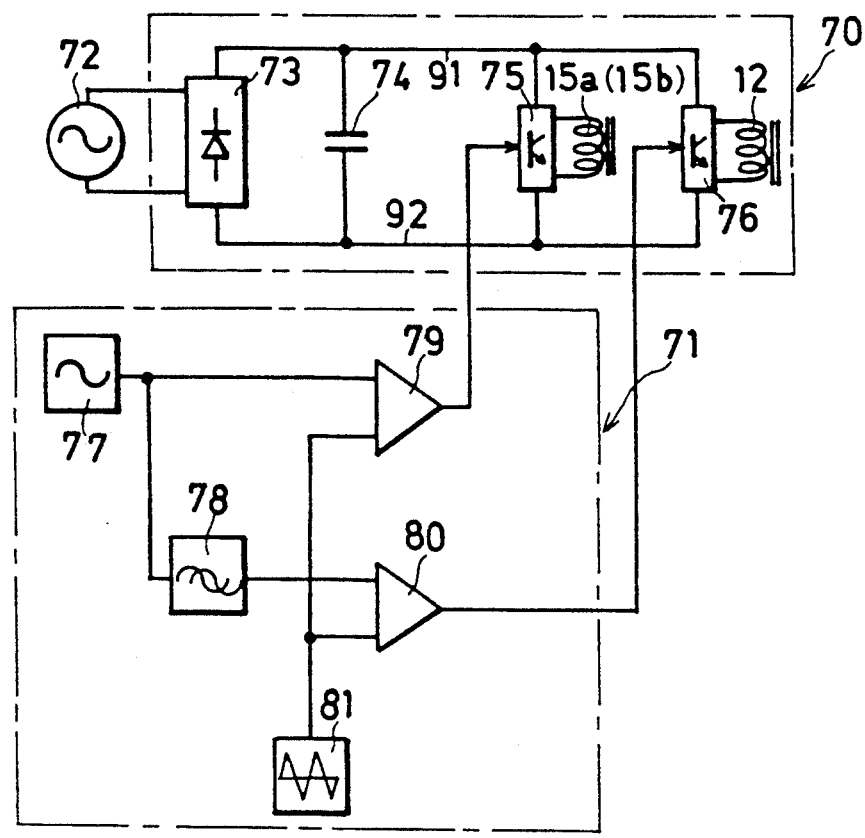
FIG. 7 is a circuit diagram of a drive circuit according to one modification for the elliptic vibratory part-feeding device.

In a drive circuit of FIG. 7, terminals of a single-phase alternative power (AC) source 72 are connected to a rectifier part 73 consisting of plural diodes in a main circuit part 70. DC output of the rectifier part 73 is smoothed by a capacitor 74 and supplied to a horizontal coil current control part 75 and a vertical coil current control part 76. The above described horizontal drive coils 15a, 15b and the vertical drive coil 12a are connected to the coil current control parts 75 and 76, respectively.

In an inverting control part 71, an output terminal of a sinusoidal wave generator 77 is connected to one input terminal of a first comparator 79 and further to a phase shifter 78. An output terminal of the phase shifter 78 is connected to one input terminal of a second comparator 80. An output terminal of a triangular wave generator 81 is connected to the other input terminals of the comparators 79 and 80. Output terminals of the comparators 79 and 80 are connected to inverting elements to be hereinafter described, in the horizontal coil current control part 75 and the vertical coil current control part 76. FIG. 9 shows the detail of the phase shifter 78 in FIG. 7. The output terminal of the sinusoidal wave generator 77 is connected through a resistor 83 to a minus (−) input terminal 82a of an operating amplifier 82. The input terminal 87 is further connected through a variable resistor 84 to a plus (+) input terminal 82b of the operating amplifier 82. A capacitor 85 is connected between the plus terminal 82b of the operating amplifier 82 and the ground. An output terminal 88 of the operating amplifier 82 is connected to the one input terminal 82a through the resistor 86.

The output terminal of the sinusoidal wave generator 77 is connected to the phase shifter 78. Accordingly, the phase of the output of the sinusoidal wave generator 77 is freely varied by an adjustment of the variable resistor 84. A variable time-constant circuit is constituted by the resistance value of the variable resistor 84 and the capacitance of the capacitor 85. Thus, the phase is adjusted.

As shown in FIG. 11A, output $V_1$ of the sinusoidal wave generator 77 has a relationship with output Vc of the triangular wave generator 81. The first comparator 79 generates rectangular waves as shown in FIG. 11B. In the time regions in which the voltage of the sinusoidal wave $V_1$ is higher than that of the triangular wave Vc, the output of the comparator becomes high at level. And in the other time regions in which the voltage of the sinusoidal wave $V_1$ is lower than that of the triangular wave Vc, the output of the comparator becomes low at level.

Figure 8:
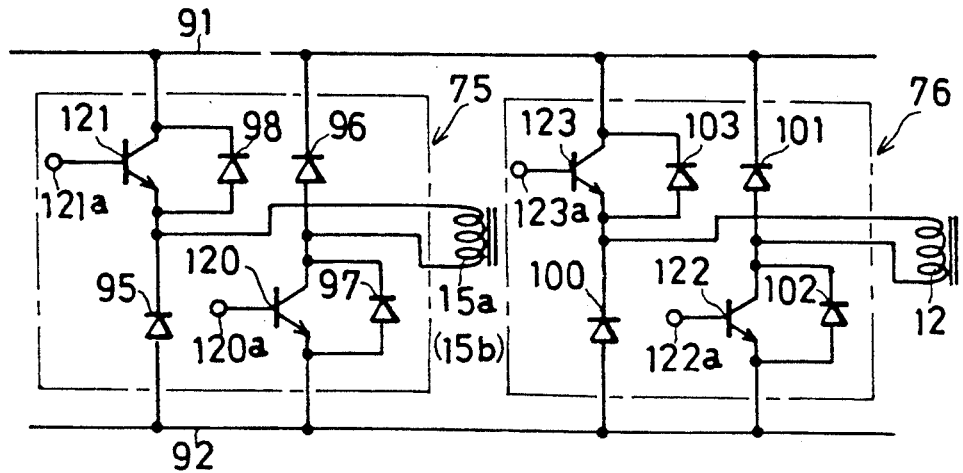
FIG. 8 is a circuit diagram showing the detail of horizontal coil current control part and vertical coil current control part in the drive circuit of FIG. 7.

FIG. 8 shows the detail of the horizontal coil current control part 75 and the vertical coil current control part 76 in FIG. 7. In the horizontal coil current control part 75 of FIG. 8, a pair of transistors 120 and 121 are connected through the horizontal drive coils 15a and 15b in series with each other between electric wires 91 and 92. Diodes 95 and 96 are similarly connected through the horizontal drive coils 15a and 15b with each other so as to intersect with the transistors 120 and 121. Further, diodes 97 and 98 are connected in parallel with the transistors 120 and 121. They function as surge killers.

The vertical coil current control part 76 is similarly constructed. Transistors 122 and 123 are connected through the vertical drive coil 12 in series with each other between the electric wires 91 and 92 and diodes 101 and 101 are connected through the vertical drive coil 12 in series with each other so as to intersect with the transistors 122 and 123. The diodes 102 and 103 are connected in parallel with the transistors 122 and 123 and they similarly function as surge killers.

Control gates 120a, 121a and 122a, 123a of the transistors 120, 121 and 122, 123 are connected to the output terminals of the comparators 79 and 80 in the inverting control part 71. The outputs of the phase shifter 78 in the inverting control part 71 are shown in FIG. 10. The output $V_1$ of the sinusoidal wave generator 77 is shifted by time difference with the adjustment of the phase shifter 78 and thus another sinusoidal output $V_2$ is obtained. The voltages $V_1$ and $V_2$ are supplied to the comparators 79 and 80. Under the relationship shown in FIGS. 11A and 11B, rectangular pulses as shown in FIG. 11B which are shifted by the phase p from each other are obtained from the comparators 79 and 80. They are supplied to the control gates 120a, 121a and 122a, 123a of the transistors 120, 121 and 122, 123 in FIG. 8. When the outputs of the comparators 79 and 80 become high at level, the transistors 120, 121 and 122, 123 become conductive. In the other 180 phase region, current flows mainly through the diodes 95, 96 and 100, 101. Thus, the alternative current in frequency of the output of the sinusoidal wave generator 77 flows through the coils 12, 15a and 15b.

With the adjustment of the phase shifter 78, the long axis of the elliptic vibration and short axis thereof are controlled so as to meet the desired requirement, or the ratio of the long axis to the short axis or the inclination of the long axis is varied.

When the above described part-jamming has occurred, the variable resistor 84 is so adjusted in the phase shifter 78 as to invert the feeding direction. Thus, the transporting direction of the parts in the spiral track 3 in the bowl 2 is inverted and so the part-jamming is released.

Figure 12:
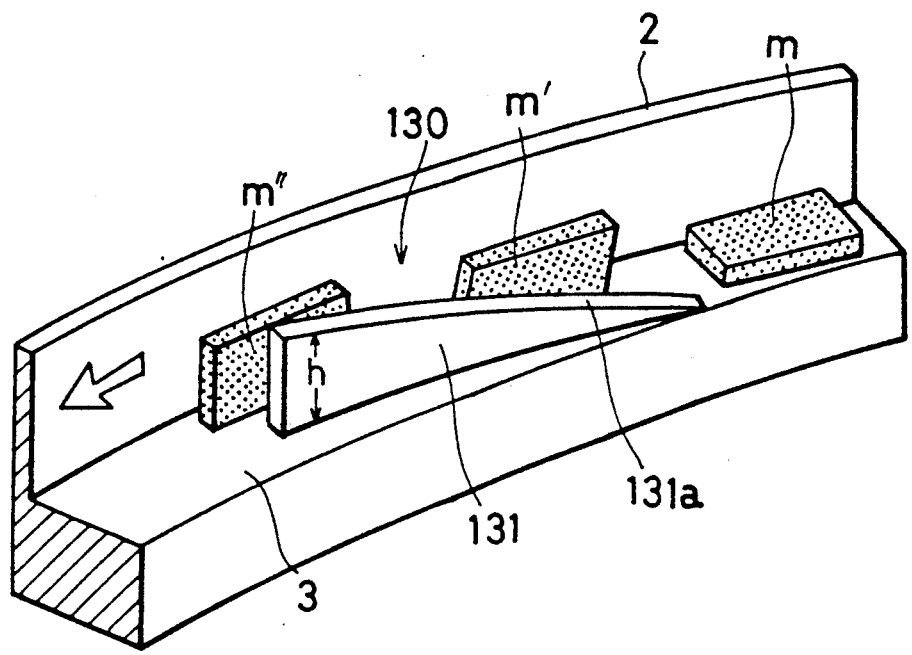
FIG. 12 is a perspective view of a part of an example of a part-orientating means for putting the feeding parts into a predetermined posture.
Figure 13:
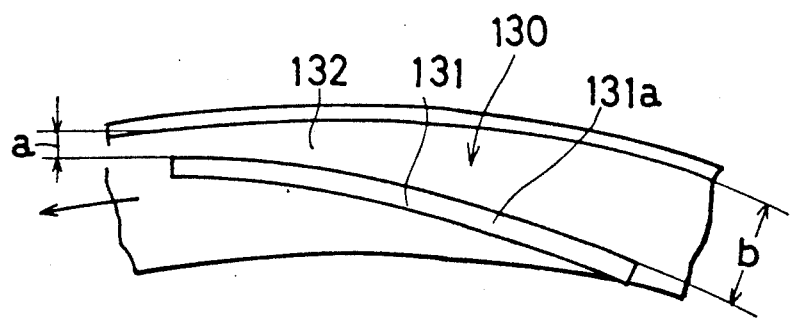
FIG. 13 is a plan view of the means shown in FIG. 12.

FIG. 12 and FIG. 13 show an example 130 of a part-orientating device applicable to the elliptical vibratory part-feeding device 1, in which a triangular plate 131 is so obliquely fixed to the track 3 as to form a narrowing path 132 in the track 3. The height h of the triangular plate 131 is nearly equal to the width of the part m. The width a of the downstream end of the narrowing path 132 i slightly larger than the thickness of the part m. The width b of the upperstream end thereof is slightly smaller than the width of the part m.

The part m of flat posture comes to ride on an edge portion 131a of the triangular plate 131 at its inner edge portion. As indicated by m', the part m is inclined more and more with the transport. As the result, the part m is orientated to an upright posture as indicated by m" in FIG. 12, and it is led to the downstreamside. When the parts m are jammed in the narrowing path 132 the feeding direction is reversed in the above described manner. Thus, the part-jamming can be easily released.

While the preferred embodiment has been described, variations thereto will occur to those skilled in the art within the scope of the present inventive concepts which are delineated by the following claims.

For example, in the above embodiment, the leaf springs 9 and 19 are used as spring means for the horizontal direction and the vertical direction in the elliptical vibratory part-feeding device 1. However, another spring means, for example, rubber spring may be used. The viscous coefficient of rubber is considerably larger than that of the leaf springs (made of steel). Accordingly, when the ratio $\lambda$ of the driving frequency to the natural frequency is nearly equal to 1, the phase difference between the driving force and the vibration or the displacement changes relatively gently near the ratio $\lambda$ of 1. But the relationship between the part transporting speed and the vibration phase does not change so much around the phase difference of 60°. Accordingly, the satisfactory results can be obtained.

Further in the drive circuit in FIG. 6, of the above embodiment, in the change-over switch $SW_3$ is changed over to the stationary contacts 43a or 43c for 60° or 120° to obtain almost the optimum condition. However, the change-over switch $SW_3$ may be omitted. In that case, the side of the movable contacts 39, 40 may be directly connected to the side of the other movable contact 41, 42. However, in this case, although the optimum condition may not be obtained, the above effect of this invention can not be lost.

Further in the above embodiment, the spiral track is formed in the counter clockwise direction in the elliptical vibratory parts feeder. Of course, a clockwise spiral track may be formed in the feeder bowl. In that case, the change-over operation between the clockwise direction and the counterclockwise direction is inverted in the initial setting operation. When the part-jamming occurs, the switch for counterclockwise and clockwise directions is changed over to the other stationary contacts.

Further in the above embodiment, the simple wiping blade has been described as a part-flow regulating means in the bowl. Instead, well-known different regulating means may be used in this invention. Of course, also other orientating means than the means shown in FIG. 12 and FIG. 13 may be used.

Also when the part m is jammed at the entrance of the guide track 5 which is covered with the plate, the feeding direction of the part m in the feeder bowl 2 may be reversed to release the part jamming.

Further, a switch for changing over the feeding direction may be arranged in the phase shifter 78 of FIG. 7. When the part-jamming is detected, the switch is automatically changed over.

A well-known part-posture judging means for judging a predetermined posture of a part may be used in the feeder bowl. For example, a cutout similar to the predetermined posture is made in a plate, and the part of the predetermined posture can pass the cutout. When the parts are jammed at the part-posture judging means, the feeding direction is reversed as in the embodiment.

What is claimed is:

1. An elliptic vibratory part-feeding device comprising:
   a feeder bowl in which a spiral track is formed;
   a first spring means for supporting said feeder bowl so as to be vibratile in a horizontal direction;
   a first electro-magnet means capable of being driven by an alternating voltage for generating a horizontal vibrating force and exciting said feeder bowl in the horizontal direction;
   a second spring means for supporting said feeder bowl so as to be vibratile in a vertical direction;
   a second electro-magnetic means capable of being driven by an alternating voltage for generating a vertical vibrating force and exciting said feeder bowl in the vertical direction;
   a phase-difference forming means through which voltages different from each other in phase are supplied to said first and second electro-magnet means from alternating electric power source, whereby an elliptical vibrating force is generated as a resultant force from said first and second electro-magnet means;
   a part-jamming detecting means for detecting that said track is blocked by a part or parts to be fed; and,
   wherein when part-jamming is detected in said feeder bowl by said part-jamming detecting means, the feeding direction of the parts on said spiral track is reversed by the change-over or adjustment of said phase-difference forming means.

2. An elliptic vibratory part feeding device according to claim 1, in which said alternating electric power source is of the three-phase, and said phase-difference forming means includes a phase change-over switch to connected selectively to one of two contacts, whereby the feeding direction of the parts on said spiral track is reversed by the change-over of said phase change-over switch from the one of the two contacts into the other thereof.

3. An elliptic vibratory part-feeding device according to claim 1, in which said phase-difference forming means comprises at least one first pair of switching elements connected to coil means of said first electro-magnet means, at least one second pair of switching elements connected to coil means of said second electro-magnet means, a sinusoidal voltage generator, a phase shifter and a pulse-width modulator, whereby a first sinusoidal voltage as the output of said sinusoidal voltage generator and a second sinusoidal voltage as the output of said phase shifter are modulated to rectangular waves by said pulse-width modulator and are supplied to said first and second pairs of switching elements, respectively, and the feeding direction of the parts on said spiral track is reversed with the adjustment of said phase shifter.

4. An elliptic vibratory part-feeding device according to claim 3, in which said phase shifter includes switching means by which said adjustment is automatically effected.

5. An elliptic vibratory part-feeding device according to claim 1, in which said part-jamming detecting means includes a light-emitting element and a light-detecting element aligning with each other, the light from said light-emitting element being intercepted by the feeding part from said light-detecting element and when said light-detecting element receives the light from said light-emitting element continuously for a longer time than a predetermined time, the part-jamming is judged to occur in said feeder bowl.

6. An elliptic vibratory part-feeding device according to claim 5, in which said feeder bowl is provided with an orientating means for orientating a feeding part or parts, and said part-jamming detecting means is arranged at the downstream side of said orientating means.

7. An elliptic vibratory part-feeding device according to claim 5 in which said feeder bowl is provided with a part-posture judging means for judging a posture of a feeding part and for passing the part of only a predetermined posture to the downstream side, and said part-jamming detecting means is arranged at the downstream side of said part-posture judging means.

8. An elliptic vibratory part-feeding device according to claim 5, in which said feeder bowl is provided with a flow regulating means for regulating flows of the parts, and said part-jamming detecting means is arranged at the downstream side of said flow regulating means.

9. An elliptic vibratory part feeding device according to claim 5, in which a linear vibratory feeder is connected to the part-discharge end of said feeder bowl with small spacing, and said part-jamming detecting means is arranged adjacent to a straight trough of said linear vibratory feeder.

10. An elliptic vibratory part-feeding device comprising:
    a feeder bowl having a spiral track therein upon which parts to be fed by the device may travel;
    a first means for resiliently supporting the feeder bowl which enables the feeder bowl to rotationally vibrate in a horizontal plane;
    a second means for resiliently supporting the feeder bowl which enables the feeder bowl to vibrate in a vertical direction;
    a first electromagnetic means capable of being driven by an alternating voltage waveform from an external source for forcing the feeder bowl to vibrate in a horizontal plane;
    a second electromagnetic means capable of being driven by an alternating voltage waveform from an external source for forcing the feeder bowl to vibrate in a vertical direction;
    means for changing the phase difference between the two voltage waveforms applied to the first and second electromagnetic forcing means to thereby change the phase angle between the feeder bowl's horizontal and vertical vibratory motion.

* * * * *